(12) United States Patent
Kashef et al.

(10) Patent No.: US 9,613,031 B2
(45) Date of Patent: Apr. 4, 2017

(54) PROFILE FOR MEDIA/AUDIO USER PREFERENCES DATABASE

(75) Inventors: Hooman Kashef, Coto de Caza, CA (US); Gene Sheridan, Palos Verdes Estates, CA (US)

(73) Assignee: SMSC HOLDING S.A.R.L., Luxembourg (LU)

( * ) Notice: Subject to any disclaimer, the term of this patent is extended or adjusted under 35 U.S.C. 154(b) by 532 days.

(21) Appl. No.: 13/076,661

(22) Filed: Mar. 31, 2011

(65) Prior Publication Data

US 2011/0246566 A1    Oct. 6, 2011

Related U.S. Application Data

(60) Provisional application No. 61/319,604, filed on Mar. 31, 2010.

(51) Int. Cl.
*G06F 15/16*    (2006.01)
*G06F 17/30*    (2006.01)

(52) U.S. Cl.
CPC .............................. *G06F 17/30035* (2013.01)

(58) Field of Classification Search
CPC ....... H04N 21/25891; H04N 21/44222; H04N 21/4532; H04L 67/306; G06F 17/30766
See application file for complete search history.

(56) References Cited

U.S. PATENT DOCUMENTS

| | | | |
|---|---|---|---|
| 8,290,903 B2* | 10/2012 | Gulin et al. | 707/621 |
| 2006/0179078 A1* | 8/2006 | McLean | 707/104.1 |
| 2007/0005990 A1* | 1/2007 | Sathish | 713/189 |
| 2008/0117202 A1 | 5/2008 | Martinez et al. | |
| 2011/0093337 A1* | 4/2011 | Granit et al. | 705/14.53 |
| 2011/0235549 A1* | 9/2011 | Ahlers et al. | 370/255 |
| 2013/0185422 A1* | 7/2013 | Rogers et al. | 709/224 |

OTHER PUBLICATIONS

International Search Report and Written Opinion for Application No. PCT/US2011/030657 dated Jul. 21, 2011, 8 pages.

* cited by examiner

*Primary Examiner* — Djenane Bayard
(74) *Attorney, Agent, or Firm* — Slayden Grubert Beard PLLC

(57) ABSTRACT

Systems and methods for providing a media profile that is based on receiving data from various content distributors and creating a media profile. The media profile is web-based and accessible via an API. Data can be provided to the media profile host server via the API, and an end-user's media preferences can be stored in the media profile. The media profile is accessed by content distributors such that a customized media experience may be offered to the end-user without the need for the content distributor to gather his own separate data. The media profile can also store billing information for the end-user and act as a single reputable platform to conduct financial transactions.

20 Claims, 4 Drawing Sheets

PROFILE FOR MEDIA/AUDIO USER PREFERENCES DATABASE

CROSS-REFERENCE TO RELATED APPLICATIONS

This application claims priority to and the benefit of U.S. provisional patent application with Ser. No. 61/319,604 filed on Mar. 31, 2010, entitled "Profile for Media/Audio User Preferences Database."

FIELD OF THE INVENTION

The present invention relates generally to the provision and use of a media profile in connection with a user preference database. The media profile is related to content provided by numerous network and internet-based media content distributors and/or providers.

BACKGROUND

Demand for networked and internet-based media/content is rising. In addition, the number and types of media sources available to end-users continues to grow rapidly and for various reasons. For instance, the amount of quality content made available to end-users is increasing, and advances in technology make it easier for the content distributors and providers to make the media content widely available. The types of sources of media is also increasing, and may include virtually any source of networked or internet-based media content, such as content stored on a networked storage device or PC (running, e.g., a Windows, Apple, or other operating system) and/or content from free or subscription-based internet media portals.

In part, the demand for networked and internet-based media is rising due to the quality and types of content now available to the end-users. This content may include any type of content distributed or provided over a network or internet-based system, such as audio (e.g., music, radio programming or content, audio books, podcasts, educational audio, etc.), video (television programming or content, movies, music videos, HD television programming or content, 3D television programming or content, etc.), and/or text and pictures (newspaper subscriptions, blog feeds or content, etc.). Many other examples of content exist, but a key development in the demand for these types of content is the quality and ease of use of the enabling technology and the variety of quality content made available to the end-users.

Another reason for the rise in the demand for content is the convenience of access to the end-user to the new sources of media content. Examples of these sources include media/content distributors and providers such as iTunes, Netflix, AppleTV, Pandora, Hulu, LastFM, in addition to the traditional content sources such as the national broadcast and cable television networks and broadcast radio, and any other companies that provide or distribute media content to end-users. These distributors and providers often take advantage of the ability to provide a personalized end-user experience to allow the end-users to customize the media experience to conform to individual preferences.

Advances in media-rendering technology make the media experience more enjoyable to end-users. Media rendering devices include a variety of product categories, such as networked TVs, IP Set Top Boxes, networked consumer electronic (CE) devices and/or networked portable devices. These devices may allow end-users to experience the media in a variety of ways and at nearly any point in time. For instance, an end-user might listen to an mp3 player while riding a bus to work, and then watch a 3D television program at home later in the day. In general, users have more access to a wide variety of media content from many types of sources than ever before.

But as the media content becomes more widely-accessible, managing the content becomes more difficult due to the fragmented and uncoordinated nature of the storage medium and internet-based sources. In part, this is due to the different design approaches taken by the different media content providers/distributors. The fragmented nature of the content/media often leads to the non-interoperability of media storage devices such as a Digital Living Network Alliance ("DLNA") server, iTunes server, Net based digital lockers, etc. In addition, in some cases, there may be multiple copies or sources for the same content or, in other cases, the rendering device may limit the availability of some content. For instance, a particular song might stored in MP3 format on a Windows PC in iTunes, but stored in Advanced Audio Coding ("AAC") format on a hand-held device.

Typically, end-users use some sort of ad-hoc or hierarchal file structure on storage media (e.g., Network Media Storage, PC/Win, iTunes, etc.) to manage media content. Some Internet-based media service providers (e.g., Pandora) provide tools for users to define their preferences and assist in searching available media content provided by that specific service provider. But these tools are inconsistent across platforms, and there are many different ways in which existing media servers might learn about the end-user's preferences. For instance, Pandora uses a thumbs-up thumbs-down approach, LastFM uses "spoofing" to keep track of songs listened from various sources, iTunes uses a ranking and comparison methodology, etc. Often the end-user must maintain multiple but similar versions of their preferred media experience profile (e.g., preferences) on multiple platforms and service provider systems because a profile on one platform (e.g., iTunes) may be incompatible with another (e.g., Pandora) based on the current design approaches.

In addition, depending on the way in which the end-user is experiencing the content, the fragmented hierarchal file structure on various storage media might negatively affect the efficiency of the system and the ultimate experience of the end-user experience. For instance, it might be difficult for an end-user to sort through a long list of files or multiple lists of files on different media serves (for example stored on a Win7 server, iTunes, universal plug-and-play ("upnp")/DLNA media server, etc.) without any coherent way to present and sort through the files.

Thus, current methods of managing and searching of media content and Internet-based sources of media are often redundant, fragmented, and lacking in efficiency. These methods often lack the use of metadata for some or all of user-owned and stored content. These methods also often lack the storage of compatible metadata from one platform to another platform or application. Thus, these methods limit how user preferences might be applied from one platform to another. As described above, it is often necessary for the end-user to enter the same or similar user preferences multiple times using different methods on different media servers.

Further compounding the problems explained above are various problems associated with managing multiple users on the same devices or networks. For instance, it can be difficult for one end-user to use a device that is customized with his or her specific user preferences, and then another end-user to use the same device customized with his or her specific user preferences. And for network-based services, it can be difficult for a device to access the user profiles unless connected to the Internet, because user profiles are often not available on local devices. There is a clear need for a good consumer experience such that preferences can be applied even if the local device should become unconnected from the network. Clearly, a need exists for a comprehensive user profile that addresses these problems.

SUMMARY OF THE INVENTION

Accordingly, techniques and supporting systems and methods as described herein address the above-described problems, as well as other issues facing current media and content providers and associated end-users. In order for media/content providers and end-users to fully realize the benefits of systems designed to provide customized content related to end-user preferences, it must become simpler for the providers to access and gather user-specific preferences, as well as easier for the end-users to customize and manage their preferences no matter what device or service they are using.

Therefore, in one aspect of the present invention, a computer-implemented method provides a media profile. The method includes receiving at a host server data from a first media distributor. The data includes an end-user's media preferences with respect to media distributed from the media distributor to the user. The method also includes receiving at the host server data from a second media distributor, this data including the end-user's media preferences with respect to media distributed from the second media distributor. The method further includes storing a media profile for the end-user on the host server. The media profile includes at least a subset of the data provided by the first media distributor and at least a subset of the data provided by the second media distributor. An application programming interface is also provided, such that the media profile, or a subset of the media profile, may be accessed by a requesting media content distributor.

In certain embodiments, the method also includes providing the application programming interface to each of the media content distributors, such that each can provide media information for an end-user to the host server, as well as receive media information from the host server. This application programming interface may facilitate receipt of the data as well as distribution of the data.

In a further exemplary embodiment, the requesting media content distributor might be the first media distributor, the second media distributor, or, in some cases, a different media distributor altogether.

In further implementations, the end-user's preferences being stored in the media profile may include metadata such as musical genre preferences, musical artist preferences, specific song preferences, playlist preferences, or other audio/music preferences. The end-user's preferences might also include things such as movie genre preferences, favorite actor/actress preferences, specific movie preferences, and billing information.

In a further exemplary embodiment, the part of the media profile provided to the requesting media/content distributor is particularized based on the distributor's preferences and the types of media that the distributor distributes and renders to the end-user.

In another aspect of the present invention, a system for providing a media profile includes a module for receiving at a host server data from a first media distributor. The data includes an end-user's media preferences with respect to media distributed from the first media distributor to the end-user. The system also includes a module for receiving at the host server data from a second media distributor, which includes the end-user's media preferences with respect to media distributed from the second media distributor. The system further includes a module for storing a media profile for the end-user on a host server. The, media profile includes at least a subset of the data provided by the first media distributor and at least a subset of the data provided by the second media distributor. The system further includes a module for providing an application programming interface such that the media profile, or a subset of the media profile, may be accessed by a requesting media content distributor.

In an exemplary embodiment, the system also includes a module for providing the application programming interface to each of the media content distributors, such that each can provide media information for an end-user to the host server, as well as receive media information from the host server. This application programming interface may facilitate receipt of the data as well as distribution of the data.

In a further exemplary embodiment, the requesting media content distributor may be the first media distributor, the second media distributor, or, in some cases be a different media distributor altogether.

In a further exemplary embodiment, the end-user's preferences stored in the media profile may include metadata such as musical genre preferences, musical artist preferences, specific song preferences, playlist preferences, or other audio/music preferences. The end-user's preferences might also include things such as movie genre preferences, favorite actor/actress preferences, specific movie preferences, and billing information.

In yet a further exemplary embodiment, the part of the media profile provided to the requesting media/content distributor is particularized based on the distributor's preferences and the types of media that the distributor distributes and renders to the end-user.

In another aspect of the present invention, a computer-implemented method for accessing a local media profile on a media device includes receiving at the media device at least part of the data that is included in a media profile from an Internet-based host server. The method also includes creating a copy of the data received to be stored locally on the media device and used as a local media profile, if, for example the device is not connected to an network. The host server generates the subset of data by receiving data from a first media/content distributor that includes an end-user's preferences with respect to media distributed from the first media/content distributor to the end-user and receiving data from a second media/content distributor that includes the end-user's preferences with respect to media distributed from the second media/content distributor. The media profile is then stored on the host server; and media profile data is distributed to the media device to be locally stored on the media device as the local media profile. The media profile includes at least a subset of the data provided by the first media distributor, and at least a subset of the data provided by the second media distributor. The method also includes determining at the media device that the media device cannot communicate with the host server, and then using the local media profile stored on the media device to customize the media experience for the end-user.

The method may also include, in some implementations, determining that the media device can communicate with the host server, and updating the local media profile based on data received from the host server. A determination may also be made that the media device can communicate on a local network with a different media device that has its own local media profile. The first media device then accesses the different media device's local media profile so that it can customize a media experience for the end-user. The media device can be any of a PC, laptop, car stereo, DVD player, Blu-Ray player, television, set-top box, mp3 player, iPod, mobile phone, iPad, tablet, or other media-rendering device.

In certain cases, the end-user's preferences stored in the media profile can include data and information such as musical genre preferences, musical artist preferences, specific song preferences, playlist preferences, or other audio/music preferences. The end-user's preferences might also include things such as movie genre preferences, favorite actor/actress preferences, specific movie preferences, and billing information.

In another aspect, a system for accessing a local media profile on a media device includes a module for receiving at a media device at least some data included in a media profile received from or provided by an Internet-based host server. The system also includes a module for creating a locally-stored copy of the data for use by the media device as a local media profile. The host server generates the subset of data by receiving data from a first media/content distributor that includes an end-user's preferences with respect to media distributed from the first media/content distributor to the end-user, and receiving data from a second media/content distributor that includes the end-user's preferences with respect to media distributed from the second media/content distributor to the end-user. The media profile is stored for the end-user on the host server and data is generated for distribution to the media device to be locally stored on the media device as the local media profile. The media profile includes at least a subset of the data provided by the first media distributor and at least a subset of the data provided by the second media distributor. The system also includes a module at the media device for determining that the media device cannot communicate with the host server, and a module for using the local media profile stored on the media device to customize the media experience for the end-user.

The media device may be a PC, laptop, car stereo, DVD player, Blu-Ray player, television, set-top box, mp3 player, iPod, mobile phone, iPad, tablet, or other media-rendering device.

In some implementations, the system also includes a module at the media device for determining that the media device can communicate with the host server, and then updating the local media profile based on data received from the host server.

In yet a further exemplary embodiment, the system also includes a module at the media device for determining that the media device can communicate on a local network with a different media device that has its own local media profile. The first media device then accesses the different media device's local media profile so that it can customize a media experience for the end-user.

In yet a further exemplary embodiment, the end-user's preferences stored in the media profile might include things such as musical genre preferences, musical artist preferences, specific song preferences, playlist preferences, or other audio/music preferences. The end-user's preferences might also include things such as movie genre preferences, favorite actor/actress preferences, specific movie preferences, and billing information.

It is to be understood that both the foregoing general description of the invention and the following detailed descriptions are exemplary, but are not restrictive, of the invention.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

The detailed description set forth below, in connection with the associated drawings, is intended to provide a description of the presently-preferred embodiments of the invention, and is in no way intended to limit the forms in which the present invention may be construed or used. Accordingly, it is well-understood by those with ordinary skill in the art that the same or equivalent functions may be accomplished by different embodiments that are also intended to be encompassed within the spirit and scope of the present invention. Moreover, with respect to particular method steps, it is readily understood by those with skill in the art that the steps may be performed in any order, and are not limited to any particular order unless expressly stated or otherwise inherent within the steps.

The systems and methods described herein facilitate the customization of a media experience for an end-user of a media device. This customization experience is facilitated by an Internet-based server, which acts as a global repository to store various "media profiles" for one or more devices and, in some cases, end-users. The term "media profile" is used herein to describe as a standardized way to store end-user media preferences related to media content. As explained above, due to the large number of different content distributors, and due to the various ways in which these distributors store media preferences, the data that exists for a particular end-user is greatly fragmented across various platforms and systems. This leads to inefficiencies and duplicative efforts on the part of the end-user, as well as a high cost of entrance into the market for new and upcoming content providers.

Figure 1:
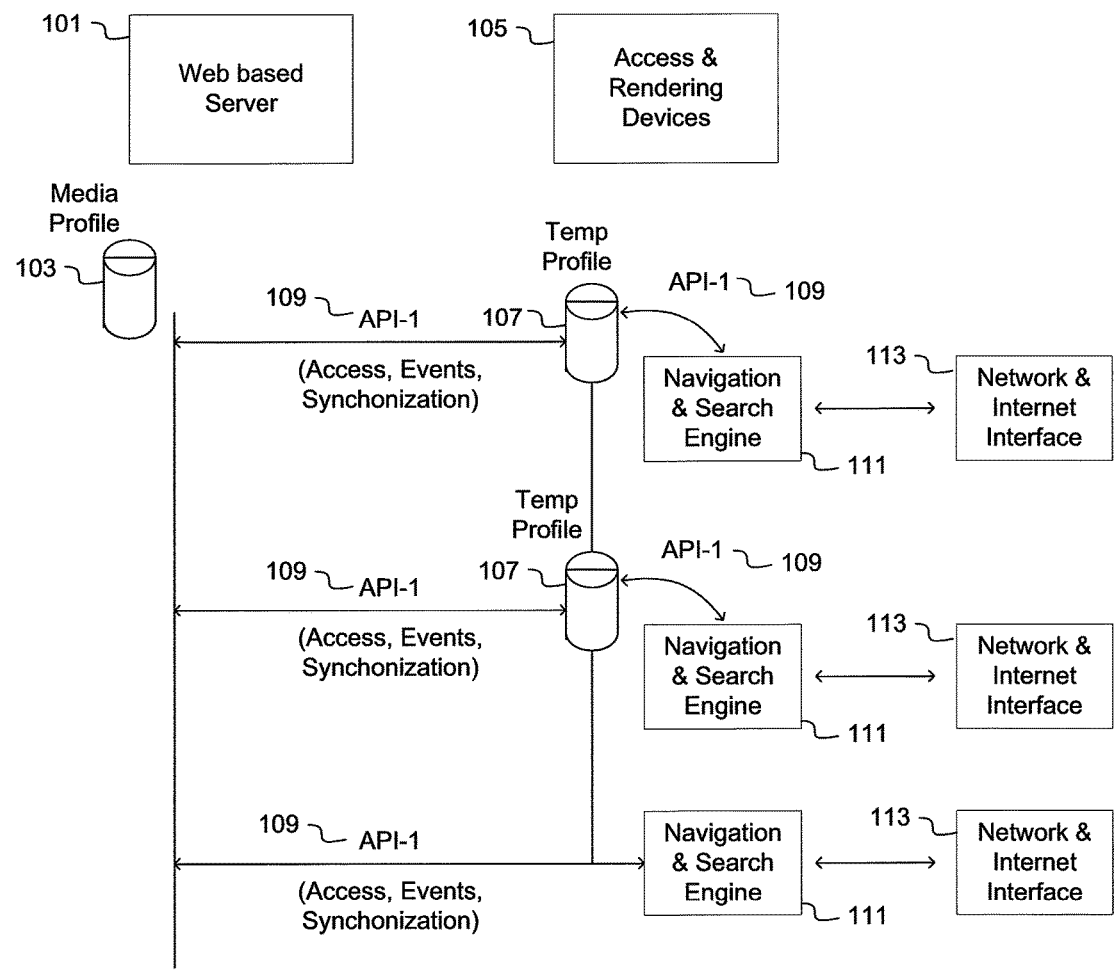
FIG. 1 illustrates an exemplary network diagram of the user preferences database for storing media profiles according to various embodiments of the invention.

As shown in FIG. 1, a web-based server 101 is used to store the media profile 103, also known as the primary profile or globally-maintained media profile. In a preferred embodiment, each end-user has a single media profile 103, and the media profile 103 has associated therewith certain uniquely identifying information such as a profile ID or account ID. The media profile may be stored in a relational database, or in any other type of memory or storage that provides access across various platforms. In some cases, a relational or other structured database may provide such functionality, for example as a database management system which stores data related to the services and consumers utilizing the service on a physical medium. Examples of the database include the MySQL Database Server or ORACLE Database Server offered by ORACLE Corp. of Redwood Shores, Calif., the PostgreSQL Database Server by the PostgreSQL Global Development Group of Berkeley, Calif., or the DB2 Database Server offered by IBM. One with ordinary skill in the art would readily understand that any type of system that stores, organizes, and/or retrieves large amounts of data easily may be used, and that the type of database used is flexible such that any particular implementation should not limit the invention as disclosed herein. Databases used to support and implement the systems and techniques described herein may also reside and execute on Internet-based servers that are managed by third party services providers such as Amazon, Google, etc.

As FIG. 1 further shows, various access and rendering devices 105 allow an end-user to engage in a customized media experience. These rendering devices 105 may be any type of media device that delivers and/or renders media content to an end-user. This might include any type of music/audio player (e.g., iPod, mp3 player, home stereo system, car stereo, etc.), video player (set-top box, television, DVD player, Blu-ray player, etc.), computer or computing device (PC, Mac, laptop, or tablet) and or handheld device (iPhone, smart phone, PDA, etc.). One with ordinary skill in the art would readily understand that the present invention is not limited by the devices listed herein, and would readily understand that so long as a device is capable of rendering media to an end-user, it is understood to be within the spirit and scope of the present invention.

The access and rendering devices 105 may have a temporary or local profile 107 stored on the device, such that the local profile 107 is quickly and easily accessible by other components of the rendering device 105. For example, one with ordinary skill in the art would readily understand that a computer that must access a database on a centralized server over the Internet may take more time to access the Web-content than the computer accessing its own local memory. This difference in access timing may be caused, in part, by latency of the network transmission, authentication time delay issues, firewall time delays, etc. Thus, it is usually more efficient to store a local copy of frequently accessed data for all these reasons.

In essence, the temporary media profile 107 acts as a locally-stored version of the globally-maintained media profile. In one embodiment, the user media profile information is consolidated in an easy-to-use and easy-to-access database in which standard APIs (Application Programming Interfaces) 109 are made available to third-party services providers and/or developers for accessing the media profile database. In this way, third-party applications may be developed to take advantage of the media profile database 103 in customizing, personalizing and enriching the media experience to the end-user by providing the most relevant media to the user (through media recommendations, personalized media playlists, personalized media streams, etc.). In some instances, the APIs may also provide access to other platforms that facilitate sharing of media profile information with friends (e.g, social networking sites such as Facebook or MySpace) and/or purchasing goods or services related to the profiles (e.g., Ticketmaster, PayPal, Amazon, etc.). APIs are generally understood by those with ordinary skill in the art to be a set of protocols or functions that allow an application to interact with another application. In this case, the API typically (but not exclusively) performs functions such as querying content, setting new parameters, modifying account access information, setting operational triggers, etc.

Media/content distributors and third parties that provide information to the media profile and access the media profile may include services such as Sirius satellite radio, Pandora, Rhapsody, iTunes, lost fm, flickr, napster, Netflix, YouTube, etc. These media/content providers are not limited to a particular type of media, but include any provider of media that is capable of customizing the experience for the particular preferences of an end-user.

In each of the rendering devices, the temporary/local profile may be accessed by a navigation and search engine 111. As further shown in the embodiment of FIG. 1, a well-defined API (API-1) interface 109 specification may be used to synchronize the primary media profile 103 and one or more of the temp/local media profile(s) 107. In one embodiment, the API-1 interface 109 enables secure access to a user's account information to or from various media service providers. The API-1 interface 109 may enable appropriate network location and addresses for other Internet-based services and/or web-based or local media storage devices 105. The API-1 interface 109 may also allow separate applications to easily access the media profile 103 to thereby provide more intuitive navigation, search, organization or recommendations 111 back to the user.

Multiple users may be managed on a single device 105 through the use of multiple user media profiles 103, typically one for each user. When a new and different end-user logs onto a device, his or her user media profile 103 may be downloaded and/or synchronized to the device 105 for use therewith. The API-1 interface 113 may also be used to manage multiple users accounts for the same rendering device.

In one embodiment, upon power-up or other start-up sequences, the rendering devices 105 attempt to establish contact with the web-based server 101 to start an initial set up of the temporary/local media profile database 107 or synchronization of an already-existing local copy. Modifications to the end-user's global media profile 103 may be communicated by event messages between the primary and the temporary/local profile databases. These message might include updates or inserts to the database, representing actions taken by the end-user on the media device 109, or may represent preferences regarding the end-user determined automatically by the rendering-device 105 or media/content distributor. While the messages may be of any form or format, certain implementations may use well-structured markup languages such as XML to transmit profile information among system components.

In another embodiment, a local navigation and search engine 111 on the rendering devices 105 queries the local temporary profile database 107 for locating the appropriate media content based on the end-user's profile. The interface 113 between the local navigation and search engine to the temporary local profile database may also conform to the API-1 interface 109 specification. Use of API-1 by the navigation and search engine 111 may allow access to both the primary profile as well as the local/temporary profile, depending on the capabilities of the local rendering device 105. For instance, a rendering device 105 which may not be able to store a local/temporary profile 107, may access the primary profile 103 directly from the web-server 101 via its navigation and search engine 111 utilizing the API-1 interface 113.

Figure 2:
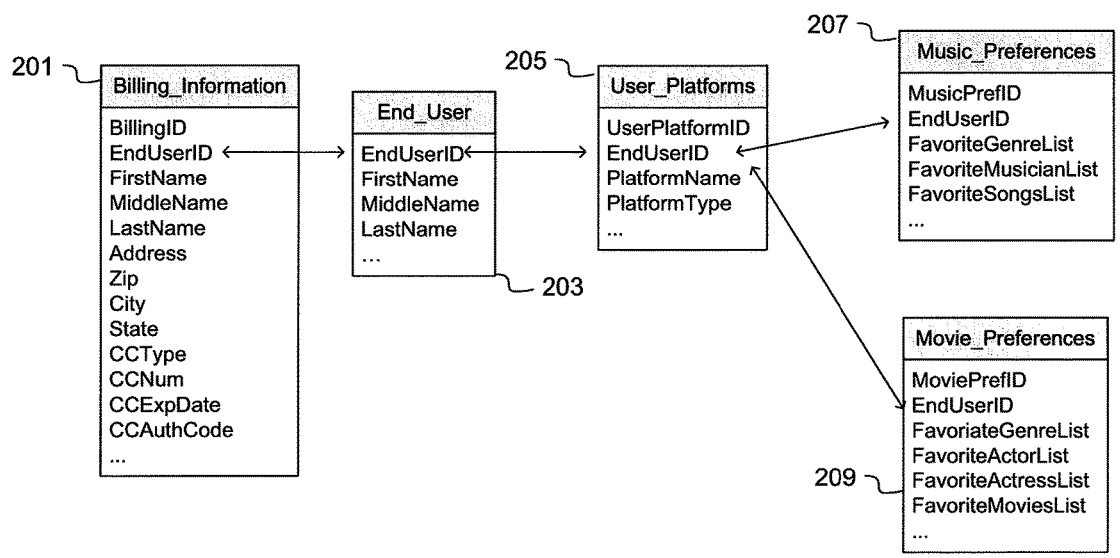
FIG. 2 illustrates an exemplary diagram of tables that could be used to comprise the media profiles according to various embodiments of the invention.

FIG. 2 illustrates one form of an exemplary media profile. It should be understood in accordance with FIG. 2, that any media preference data may be stored in the media profile 103, and the media profile database 103 is not limited to the tables and/or fields of FIG. 2, nor is this very generic description intended to limit the invention in any way. Accordingly, it is generally understood that data identifying and describing the end-user is to be stored in an end-user table 203, such that media preference information concerning that user may be linked for insert, update, and retrieval.

In one embodiment, the media profile database 103 resides on an Internet-based server and is accessed from any device connected to the Internet. Depending on the capabilities of a media-rendering device 105, the information held within the media profile 103 may be used to search across all available media content and media sources in delivering, recommending or personalizing the content for each user. The end-user need not keep track of the location or the method of access for their preferred media content. The end-user also need not re-input their preferences or user profile across multiple media services. In fact, in one embodiment, metadata is automatically generated by continuously monitoring all of the digital media that the consumer is rendering (i.e., across all media sources and all rendering devices). In fact, in some instances the end-user may not need to provide any stated user preferences to create a useful and comprehensive media profile, as the profile is automatically built based on causal use of the media device in conjunction with one or more media sources. In addition, multiple users may be accommodated by including a user log-in for each media-rendering device 105 and each media rendering experience to create and maintain unique media profiles for each user, even within the same local network 317 and for the same devices.

It is also possible for the metadata to track and store the location of the media content, as well as any relevant information regarding the platform, content provider, etc. related to the content. In many cases, the stored media content may not originally be accompanied by any metadata (e.g., an mp3 file stored on a PC), and the invention described herein facilitates the generation of appropriate metadata related to the media/content as part of the aggregating and managing of the content across multiple platforms.

In other implementations, a single user preferences database, or media profile 103 may be automatically created for use with all of a user's media-rendering devices 105 and with all of the user's stored media content (including any and all network-based media services that the user is subscribed to or frequently uses). The media profile 103 may be stored on a central host server 101, and maintained such that it contains current information about the end-user's media experiencing preferences, list and access information of privately owned storage media that contain private content (such as content purchased by the end-user and stored locally on a PC as opposed to Internet-based content only available via streaming such as Pandora or YouTube), list of subscription-based service providers with appropriate account access information, and/or a preferred list of free media service providers, etc. Preferences may describe the type of media a user frequently listens to (e.g., pop, country, classic rock), particular artists, eras, albums, and the like.

The media profile 103 may also include user stated/given inputs on media preferences, metadata for some or all user owned/stored content, and/or automatically-generated metadata of most commonly rendered media across all sources of content and media sources (e.g., media playing history). This broad and comprehensive definition of the media profile 103 enables a much more customizable, intelligent and relevant media experience for the end-user. The media profile 103 may also include traditional user profile information such as name, age, address and/or region, preferred language and payment or billing information (credit card number, PayPal account, etc.).

In another exemplary embodiment, there may be multiple sub-profiles associated with a media profile 103 such that an end-user can expressly choose a sub-profile for use at a particular time, or, in some cases, a sub-profile may be automatically selected based on the day and/or time of day. For instance, an end-user might prefer loud rock music while exercising, but prefer soft classical music while at work, and a sports radio transmission while in the car. Thus, the integration of sub-profiles in the media profile 103 allows for better customization and personalization to be delivered to the end-user.

The media profile 103 may be stored on a web-based server. This profile may be referred to as the "primary profile" or universal profile. The web-based server may support a well-defined set of APIs for securely accessing the primary profile data by the end-user from any web-enabled rendering device 105.

Authentication may be achieved by using any kind of password-controlled access or even biometric methods (e.g., fingerprint scan, etc.), and the communication protocol itself may be made securing using, for instance, http and SSL/TLS or SSH type protocols and encryption mechanism.

The rendering device 105 may download a version of the media profile and keep a local copy, also referred to as the temporary profile or temp profile 107. In one embodiment, the local/temporary profile 107 allows the same level of search and experience to the user when the rendering device 105 is disconnected from the Internet 301. The local/temporary profile 107 may provide the capability of use in a private network 317 (e.g., within a home network that is disconnected to the Internet).

The primary 103 and temporary 107 profiles may synchronize on a regular basis, on special trigger events, or at other times if they are connected. In one embodiment, synchronization occurs upon the next available opportunity after a disconnected rendering device 105 becomes reconnected to the Internet 301. The use of a local/temporary profile 107 may also serve as a local cache of the primary profile 103 data to speed the response time when accessing the media profile data base 103.

The media profile 103 may include billing information 201 stored in a secure database, so that various media/content provider platforms do not need to separately store this billing information. Then, for instance, if an end-user wishes to purchase content from a particular content provider or platform, the content provider simply needs to access the media profile 103 from either the globally-maintained media profile or from the temporary media profile 107 in order to retrieve the end-user's billing information. As explained above, this may be facilitated through the API-1 interface 113.

Numerous benefits may be realized by using a common billing platform. For instance, this type of system allows new entrants into the content provision market to take advantage of the respected name of the host billing system. Analogously, an end-user may be comfortable purchasing products on the Internet using a service such as Paypal, because of the trusted name Paypal and the security associated therewith. Likewise, an end-user could become comfortable with the security of the transactions conducted with new media/content providers, based on the trusted name of the media profile database and the billing information provided therein.

Referring still to FIG. 2, a user platforms table 205 is stored such that various media/content distributors may be linked to the end-user. This facilitates the storage of global information that may be inserted, updated, and accessed by the media/content distributors. The actual media preferences may depend on the needs of the media/content distributors, but in general, the preferred embodiment stores a superset of the information stored by the media/content distributors. Thus, for example if iTunes stores the most frequently listened to music by a particular end-user, and if Pandora stores an "up" or "down" rating by the end-user of a particular song, then the media profile database can include both the frequently listened to list as well as the "up" and "down" ratings of particular songs. In this way, the system collaborates of all the media preferences for a given end-user based on the data received from the various sources of content.

The media profile 103 may also adapt to a new content/media distributor wishing to store new media preference information. In such cases, the back-end schema of the database may be updated and new functions may be included in the API such that the new media preference information may be utilized.

In some implementations, an end-user may be provided with direct access to the media profile database 103 to update the various pieces of information through a portal or Internet-based website, other than the intermediary media/content distributors. In this way, an end-user can login to the media profile system and update her billing information 201 associated with the account. Alternatively, an end-user might change her billing information through a media/content distributor such as, for example, iTunes, at which point iTunes uses the API to update the end-user's billing information 201 on the globally-maintained media profile database.

Various other tables may be utilized by the media profile 103, such as a music preferences table 207 or a movie preferences table 209. These tables can include information such as favorite artists or actors, favorite genres, favorite movies or songs, etc. In many instances, the user-preference information stored in the media profile 103 is stored in a greater number of tables, due to the size and diverse types of information that media/content distributors currently use to determine user preferences and to customize the media experience. For instance, it is also possible to store playlist and shuffle preferences, which also allows a media/content distributor in delivering a customized media experience to the end-user.

Figure 3:
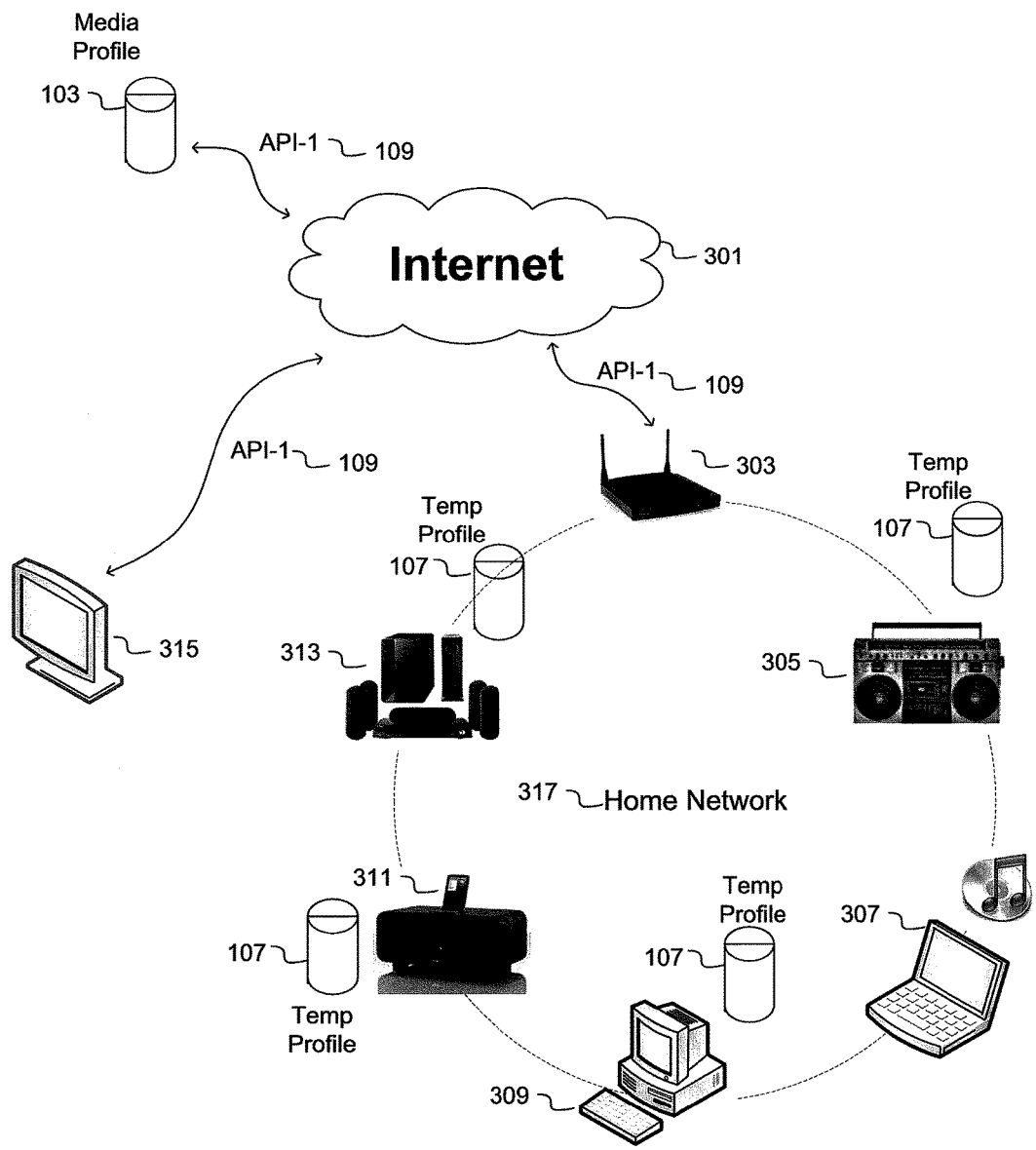
FIG. 3 illustrates an exemplary network diagram of the use of the locally stored profiles on media-rendering devices according to various embodiments of the invention.

FIG. 3 shows one embodiment of a deployment and use case model for the proposed architecture. It is understood that they system may contain software and hardware 303, 305, 307, 309, 311, 313, 315 connected to the Internet 301 via a network. In this way, the media devices are capable of communicating with the media profile 103 located on the web-based host server 101. Although FIG. 1 shows the web-based server 101 as a single box imply a single physical hardware device, it should be appreciated that the functionality of these components may be implemented on any number of computers. A communications network connects a client with a server. The communication may take place via any media such as standard telephone lines, LAN or WAN links (e.g., T1, T3, 56 kb, X.25), broadband connections (ISDN, Frame Relay, ATM), wireless links (802.11, Bluetooth, etc.), and so on. Preferably, the network can carry TCP/IP protocol communications, and HTTP/HTTPS requests made by the web browser and the connection between the client software and the server can be communicated over such TCP/IP networks. The type of network is not a limitation, however, and any suitable network may be used. Non-limiting examples of networks that can serve as or be part of the communications network include a wireless or wired Ethernet-based intranet, a local or wide-area network (LAN or WAN), and/or the global communications network known as the Internet 16, which may accommodate many different communications media and protocols.

As further shown in FIG. 3, the media profile, also known as the primary profile, may be accessed by any of the media-rendering devices 303, 305, 307, 309, 311, 313, 315. However, such access is dependent on an active Internet connection 301 and might present a difficulty if the Internet access is unavailable or if the available bandwidth is insufficient for any reason. Thus, once it is determined at a media-rendering device 303, 305, 307, 309, 311, 313, 315 that Internet 301 connection is available, a copy of the media profile 103 may be stored locally on the media-rendering device such that when Internet access becomes unavailable or the bandwidth falls below a certain acceptable threshold, the media preferences can still be accessed and utilized. Thus, an end-user listening to music using an application on PC 309 might not need to have Internet 301 connection in order to enjoy a personalized media experience based on preferences captured at various online media content sites if the application contains a temporary media profile 107 that the application is capable of utilizing.

For example, as shown in FIG. 3, the portable radio 305, PC 309, home radio 311, and home DVD/stereo system 313 all contain or otherwise use a temporary/local profile 107 that is a copy of the media profile 103, or, in some cases, a subset of the media profile 103. One with ordinary skill in the art would readily understand that a copy of the entire media profile may be utilized by more extensive applications that offer both music, video, and other types of media/content. However, if a content/media distributor only offered, for instance, music, the only type of temporary/local profile information that would be necessary to store for the media-rendering application on the media device would be information related to music. These decisions could be implemented via the API, and thus, the system is flexible depending on the third-party requirements.

As an alternative embodiment, the television 315 and laptop computer 307 might only choose to access the media profile 103 through the Internet connection 301. A benefit to this approach may include that the most current and up-to-date information is always in use at the media-rendering device, although access time to the profile may suffer, and the system may become inoperable without Internet connection. One with ordinary skill in the art would also readily understand that various configurations of the above are possible, such that a device first attempts to access the web-based profile, but then resorts to its own local copy if the web connection is unavailable.

By way of example, in one embodiment, if an end-user entered billing information into a media-rendering application on laptop 307, the application may access the API 109 on the web-based server 101 in order to update the global information in the end-user's media profile. Then in the future when the end-user desires to purchase content using an application on television 315, the television application might also access the billing information already entered by the end-user and stored in the web-based server 101.

The media profile database 103 may continuously (or in some instances with certain frequency) monitor the end-user's inputs and behavior to improve and add to the media profile 103, via the API 109. In a non-limiting manner various inputs may be continuously monitored and included in the database. For example, some or all frequently played media files, playlists or streams (frequency could be, for instance, tracked based on any file/playlist/stream that is rendered for more than 15 seconds) may be monitored. In addition, some or all end-user explicit inputs regarding media preferences may be monitored. These inputs may be "stated" (entered) inputs from the end-user on media preferences from any source or application, and/or any positive/ negative feedback received for a given media file/stream from any source or application (as created thru existing third-party applications). Even specific end-user searches related to various media requests may be stored and analyzed to determine the end-user's interests and preferences. Also, the media profile database 103 may monitor the most frequently used media devices 105 for rendering the media (e.g., frequency may be tracked based on cumulative time spent rendering media on a given device), and/or any purchased media, or downloaded content or media streaming services to which the user subscribes.

By way of example, the above end-user inputs and behaviors may be integrated into the media profile 103 database as described herein. For example, the system may integrate frequently rendered media (e.g., metadata for files and/or URLs for media streams along with frequency data), frequently used rendering devices (e.g., device type, MAC ID with frequency data), new media "accessed" (e.g., downloaded, purchased or subscribed/registered), metadata for files and/or URL for media streams, stated media preferences (e.g., genre, era, artist, album, etc) as gathered from all user inputs across all media applications, services or subscriptions, and/or basic user profile information (name, age, address and/or region, preferred language and payment/ billing information, etc).

The above-described media profile database 103 may be made accessible by numerous third-party service providers or application developers through the stated API-1 interface 109 specification. In some instances, the determination as to which third-party providers have access is made by the end-user, thus allowing the user to control which companies, websites, services and individuals can view and share their profile information. An additional advantage of the above-described invention is that the user-preference media content is easily translated from one format to another, as required by the media/content providers, such that the translation is completely transparent to the end-user. Since the above systems and methods allow the end-user to enter data only once, it facilitates the translation of data as required by different formats and protocols.

Figure 4:
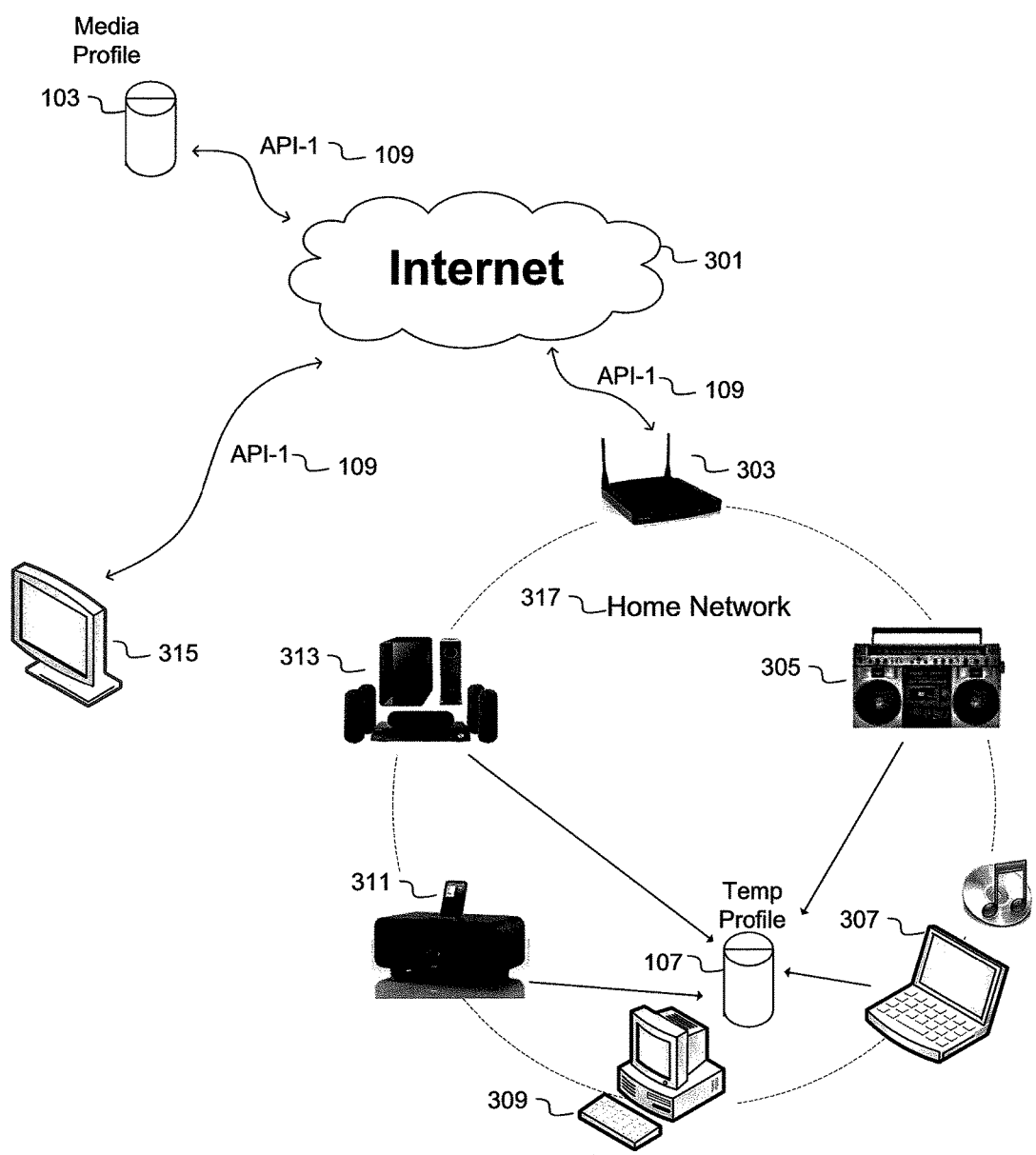
FIG. 4 illustrates another exemplary network diagram of the use of the locally stored profiles on media-rendering devices according to various embodiments of the invention.

Tt is also possible for other network renderers or controllers to access the local/temporary profile of another media-device through a local network as long as at least one rendering device on the local network has access to and downloaded the media profile data 103 from the server 101. FIG. 4 shows a possible network configuration for such an embodiment. In this example, each of the media devices 313, 311, 307, and 305 has access to the temporary/local media profile 107 stored on the PC 309, so that when an Internet connection 301 to the server 101 is disabled, a customized media experience can still be delivered to the end-user.

As described above, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

What is claimed is:

1. A computer-implemented method for providing a media profile, said method comprising:
  receiving at a host server first data from a first content distributor, said first data comprising an end-user's preferences associated with first media distributed from the first content distributor to the end-user;
  receiving at the host server second data from a second content distributor, said second data comprising the end-user's preferences associated with second media distributed from the second content distributor to the end-user;
  storing a media profile for the end-user on the host server, said media profile including (i) at least a subset of the first data comprising the end-user's preferences associated with the first media, and (ii) at least a subset of the second data comprising the end-user's preferences associated with the second media; and
  providing, via an application programming interface, at least a subset of the media profile to a requesting content distributor in response to a request from the requesting content distributor.

2. The method of claim 1, further comprising:
  providing the application programming interface to the first content distributor, the second content distributor, and the requesting content distributor,
  wherein the application programming interface facilitates receipt of the first data by the host server and the second data by the host server.

3. The method of claim 1, wherein the requesting content distributor is selected from the group consisting of: a new content distributor different from the first content distributor and the second content distributor, the first content distributor, and the second content distributor.

4. The method of claim 1, wherein the end-user's preferences include: musical genre preferences, musical artist preferences, specific song preferences, movie genre preferences, movie actor/actress preferences, specific movie preferences, and billing information.

5. The method of claim 1, wherein the subset of the media profile provided to the requesting content distributor is particularized based on distributor preferences and the types of media that the requesting content distributor distributes or renders to the end-user.

6. A system for providing a media profile, said system comprising:
  a host server operable to receive:
    first data from a first content distributor, said first data comprising an end-user's preferences associated with first media distributed from the first content distributor to the end-user;
    second data from a second content distributor, said second data comprising the end-user's preferences associated with second media distributed from the second content distributor to the end-user;
  a memory communicatively coupled to the host server, the memory operable to store a media profile for the end-user on the host server, said media profile including (i) at least a subset of the first data comprising the end-user's preferences associated with the first media, and (ii) at least a subset of the second data comprising the end-user's preferences associated with the second media; and the host server is operable to provide, via an application programming interface, at least a subset of the media profile to a requesting content distributor in response to a request from the requesting content distributor.

7. The system of claim 6, wherein:

the host server is further operable to provide the application programming interface to the first content distributor, the second content distributor, and the requesting content distributor, wherein the application programming interface facilitates receipt of the first data by the host server and the second data by the host server.

8. The system of claim 6, wherein the requesting content distributor is selected from the group consisting of: a new content distributor different from the first content distributor and the second content distributor, the first content distributor, and the second content distributor.

9. The system of claim 6, wherein the end-user's preferences include: musical genre preferences, musical artist preferences, specific song preferences, movie genre preferences, movie actor/actress preferences, specific movie preferences, and billing information.

10. The system of claim 6, wherein the subset of the media profile provided to the requesting content distributor is particularized based on distributor preferences and the types of media that the requesting content distributor distributes or renders to the end-user.

11. A computer-implemented method for accessing a local media profile on a media device, said method comprising:

receiving at a media device at least a subset of data included in a media profile from an Internet-based host server, creating a copy of the subset of the data included in the media profile to store locally on the media device as a local media profile, wherein the host server generates the subset of the data included in the media profile by:

receiving at the host server first data from a first content distributor, said first data comprising an end-user's preferences associated with first media distributed from the first content distributor to the end-user;

receiving at the host server second data from a second content distributor, said second data comprising an end-user's preferences associated with second media distributed from the second content distributor to the end-user;

storing the media profile for the end-user on the host server, said media profile including (i) at least a subset of the first data comprising the end-user's preferences associated with the first media, and (ii) at least a subset of the second data comprising the end-user's preferences associated with the second media; and generating the subset of the data included in the media profile to distribute to the media device to be stored locally on the media device as the local media profile;

determining at the media device that the media device cannot communicate with the host server; and using the local media profile stored on the media device to customize a media experience for the end-user.

12. The method of claim 11, further comprising:

determining at the media device that the media device can communicate with the host server, and updating the local media profile based on data received from the host server.

13. The method of claim 11, further comprising:

determining at the media device that the media device can communicate on a local network with a different media device having a local media profile, and accessing the local media profile of the different media device to customize a media experience of the end-user.

14. The method of claim 11, wherein the media device is selected from the group consisting of: a PC, laptop, car stereo, DVD player, Blu-Ray player, television, set-top box, iPod, mp3 player, mobile phone, and tablet.

15. The method of claim 11, wherein the end-user's preferences include: musical genre preferences, musical artist preferences, specific song preferences, movie genre preferences, movie actor/actress preferences, specific movie preferences, and billing information.

16. A system for accessing a local media profile on a media device, said system comprising:

a media device operable to:

receive at least a subset of data included in a media profile from an Internet-based host server, create a copy of the subset of the data included in the media profile to store locally on the media device as a local media profile, wherein the host server generates the subset of the data included in the media profile by:

receiving at the host server first data from a first content distributor, said first data comprising an end-user's preferences associated with first media distributed from the first content distributor to the end-user;

receiving at the host server second data from a second content distributor, said second data comprising an end-user's preferences associated with second media distributed from the second content distributor to the end-user;

storing the media profile for the end-user on the host server, said media profile including (i) at least a subset of the first data comprising the end-user's preferences associated with the first media, and (ii) at least a subset of the second data comprising the end-user's preferences associated with the second media; and generating the subset of the data included in the media profile to distribute to the media device to be stored locally on the media device as the local media profile;

determine that the media device cannot communicate with the host server; and use the local media profile on the media device to customize a media experience for the end-user.

17. The system of claim 16, wherein the media device is further operable to determine that the media device can communicate with the host server, and update the local media profile based on data received from the host server.

18. The system of claim 16, wherein the media device is further operable to determine that the media device can communicate on a local network with a different media device having a local media profile, and access the local media profile of the different media device to customize a media experience of the end-user.

19. The system of claim 16, wherein the media device is selected from the group consisting of: a PC, laptop, car stereo, DVD player, Blu-Ray player, television, set-top box, iPod, mp3 player, mobile phone, and tablet.

20. The system of claim 16, wherein the end-user's preferences include: musical genre preferences, musical artist preferences, specific song preferences, movie genre preferences, movie actor/actress preferences, specific movie preferences, and billing information.

* * * * *